United States Patent
Reinert

[11] 3,933,408
[45] Jan. 20, 1976

[54] MICROSCOPE-ILLUMINATING SYSTEM

[76] Inventor: Guido Georg Reinert, Allgauer Strasse 103, D-8000 Munich 71, Germany

[22] Filed: Mar. 6, 1974

[21] Appl. No.: 448,737

[30] Foreign Application Priority Data
Mar. 6, 1973 Austria .................... 1977/73

[52] U.S. Cl. .................. 350/87; 240/2 MA
[51] Int. Cl.² ..................... G02B 21/08
[58] Field of Search .............. 350/87; 240/2 MA

[56] References Cited
UNITED STATES PATENTS

| | | | |
|---|---|---|---|
| 2,730,923 | 1/1956 | Gorham et al. | 350/87 |
| 2,738,708 | 3/1956 | Rosin | 350/87 |
| 3,137,761 | 6/1964 | Conradi et al. | 350/87 |
| 3,414,345 | 12/1968 | Mollring | 350/87 |
| 3,421,808 | 1/1969 | Gottlieb | 350/87 |
| 3,679,287 | 7/1972 | Takahashi et al. | 350/87 |
| 3,799,645 | 3/1974 | Stankewitz | 350/87 |

Primary Examiner—David H. Rubin
Attorney, Agent, or Firm—Ernest G. Montague; Karl F. Ross; Herbert Dubno

[57] ABSTRACT

Light from a fluorescent lamp successively passes a field stop, a condensing lens assembly close to that stop, an aperture stop and a microscope objective. The condensing lens assembly projects an aerial image of the lamp in the vicinity of the aperture stop and focuses the field stop at infinity; the microscope objective focuses an image of the field stop on its object plane. A dispersive lens may be interposed between the fluorescent lamp and the field stop to enable the use of condensing lens assemblies of short focal length.

4 Claims, 3 Drawing Figures

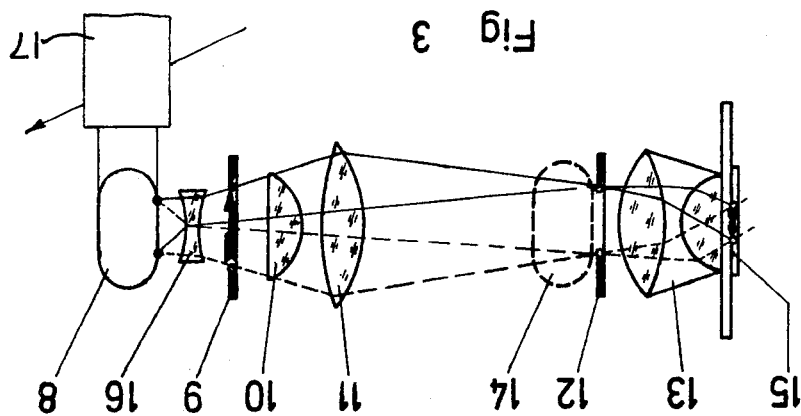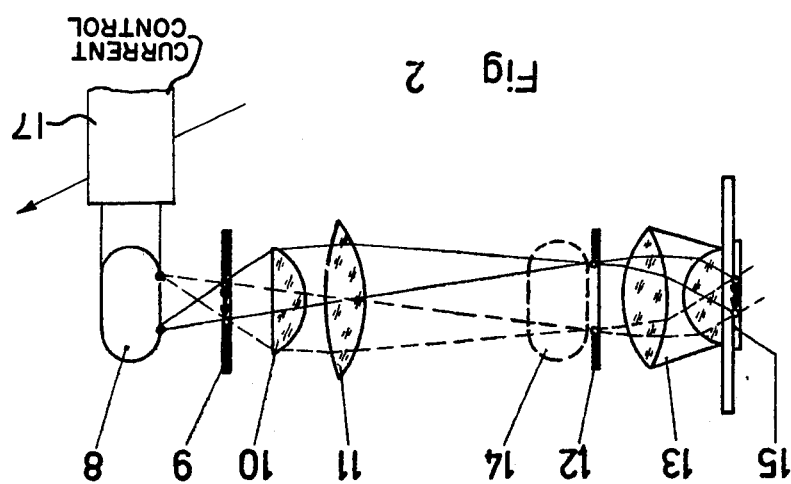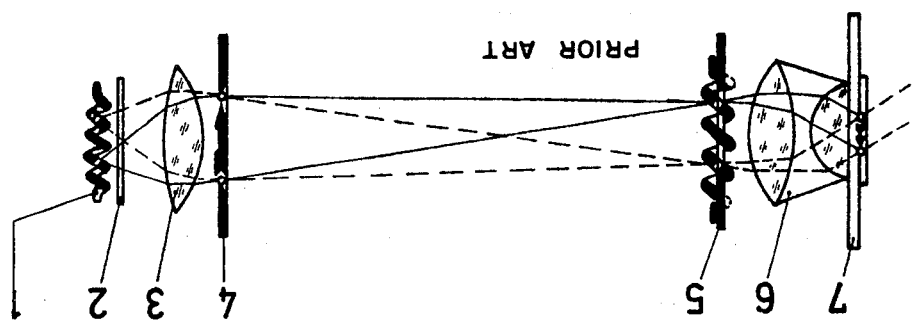

MICROSCOPE-ILLUMINATING SYSTEM

FIELD OF THE INVENTION

My present invention relates to a microscope-illuminating system utilizing the Kohler principle of illumination.

BACKGROUND OF THE INVENTION

According to the well-known Kohler principle, the image of a light source is projected through a collective lens by way of a first diaphragm onto an image plane of a microscope objective for illumination of its object plane. It is also known in such a system to insert a pair of axially spaced diaphragms between the light source and the objective, i.e. a first diaphragm proximal to the source serving as a field stop and a second diaphragm remote from the source acting as an aperture stop; the latter diaphragm lies in the image plane of the microscope objective. Since the filaments of the ordinary incandescent lamps produce a disjointed image, a diffuser such as a plate with a matt finish is generally disposed behind the lamp to scatter its light rays. In many instances, moreover, it is necessary to provide a protective heat filter or special cooling means.

OBJECT OF THE INVENTION

The object of my present invention is to provide an illuminating system of the character described which uses cold light, thus eliminating the need for heat-protective means, and which does not require the interposition of light-scattering surfaces between the primary source and the microscope objective.

SUMMARY OF THE INVENTION

In accordance with my present invention, an aerial image of a fluorescent lamp serving as the light source is produced just ahead of the aperture-control diaphragm by collective lens means positioned between the two diaphragms, preferably close to the field-control diaphragm and remote from the aperture-control diaphragm, the same collective lens means serving to focus the field-control diaphragm at infinity whereby an image of that diaphragm is formed at a focal plane of the microscope objective, namely the aforementioned object plane, which is illuminated by rays from the aerial lamp image.

If necessary, the apparent position of the fluorescent lamp may be moved even closer to the collective lens means (thereby allowing a shortening of the focal lengths from the latter) by the insertion of dispersive lens means between the lamp and the field-control diaphragm proximal thereto.

The luminous intensity of such a fluorescent lamp can be readily varied by controlling its energizing voltage or current.

BRIEF DESCRIPTION OF THE DRAWING

The above and other features of my invention will now be described in detail with reference to the accompanying drawing in which:

FIG. 1 is a diagrammatic view of a conventional microscope-illuminating system based on Kohler's principle;

FIG. 2 is a view similar to FIG. 1, showing my present invention; and

FIG. 3 is a view like FIG. 2 but illustrating a modification designed for the illumination of larger fields of view.

SPECIFIC DESCRIPTION

FIG. 1 shows a conventional illumination system in accordance with Kohler's principles wherein an aerial image of the filament of a lamp 1 is formed in the plane of an aperture-control diaphragm 5 by a convergent lens 3, the filament image being homogenized by a diffuser element 2. A diaphragm 4 disposed in front of the image plane is focused onto an object plane 7 by a condensing objective 6.

In contrast to this conventional system, FIG. 2 shows a fluorescent lamp 8 disposed at an appropriate distance from a diaphragm 9 whcih defines the image field. An ancillary lens system 10, 11 forms an aerial lamp image 14 immediately ahead of an aperture stop 12 preceding a condensing microscope objective 13. Field diaphragm 9 is disposed in the front focal plane of the ancillary lens system 10, 11. It is focused at infinity by lenses 10, 11 so that via the condenser 13 an image of this field-control diaphragm the light is formed in the object plane 15. Means for controlling the operating current of lamp 8 to vary the light intensity have been indicated diagrammatically at 17. A weak yellow filter, not shown, may be used to block objectionable ultraviolet radiation.

In cases where, for better illumination of the field of light, a greater overall length is required to determine the sizes in which the lamp image is depicted, I prefer to insert a supplemental lens 16 the ray path between lamp 8 and field stop 9 as shown in FIG. 3. This is necessary if, in consideration of the size of the aperture stop 12, lens system 10, 11 must have a very short focal length.

The novel illuminating system according to my invention makes it possible for the first time expediently to employ cold light while fulfilling Kohler's conditions of illumination so that the diaphragm delineating the light field and also the location of the light-source image are properly associated with the path of the light rays in the microscope. The short and compact structure which is made possible by this arrangement makes it possible with almost any microscope equipped with a condenser to carry out Kohler's illumination properly in conjunction with cold light.

I claim:

1. An illuminating system for a microscope provided with an objective, comprising:
   a fluorescent lamp remote from said objective;
   a field-control diaphragm proximal to said lamp and an aperture-control diaphragm remote from said lamp disposed along the objective axis between said objective and said lamp; and
   collective lens means between said diaphragms producing an aerial image of said lamp immediately ahead of said aperture-control diaphragm while focusing said field-control diaphragm at infinity whereby an image of said field-control diaphragm is formed at a focal plane of said objective illuminated by rays from said aerial image.

2. A system as defined in claim 1 wherein said collective lens means is disposed relatively close to said field-control diaphragm and relatively remote from said aperture-control diaphragm.

3. A system as defined in claim 2, further comprising dispersive lens means between said lamp and said field-control diaphragm.

4. A system as defined in claim 1 wherein said lamp is provided with control means for varying its luminous intensity.

* * * * *